Figure 1:
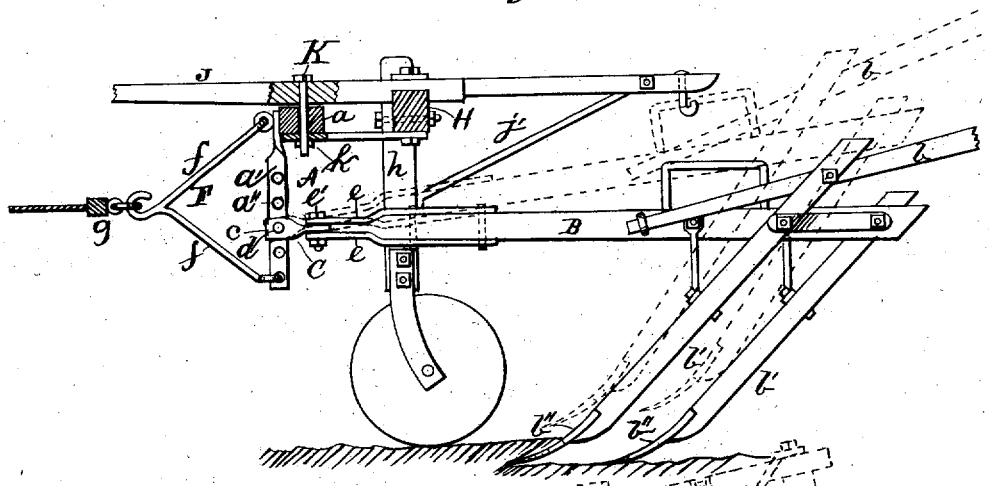

J. SCHRODER,

Assignor to H. H. PATTEE.

CULTIVATOR.

No. 7,496. Reissued Feb. 6, 1877.

Witnesses
A. M. Callum
D. Hannay

Inventor:
John Schroder,
By H. B. Richards
Atty.

N. PETERS, PHOTO-LITHOGRAPHER, WASHINGTON, D. C.

UNITED STATES PATENT OFFICE.

JOHN SCHRÖDER, OF KICKAPOO, ASSIGNOR TO HENRY H. PATTEE, OF MONMOUTH, ILLINOIS.

IMPROVEMENT IN CULTIVATORS.

Specification forming part of Letters Patent No. 69,255, dated September 24, 1867; reissue No. 7,496, dated February 6, 1877; application filed January 16, 1877.

DIVISION A.

*To all whom it may concern:*

Be it known that I, JOHN SCHRÖDER, of Kickapoo, in the county of Peoria and State of Illinois, have invented certain new and useful Improvements in Cultivators.

The following description, taken in connection with the accompanying plate of drawings, hereinafter referred to, forms a full and exact specification, wherein are set forth the nature and principles of the invention, by which the same may be distinguished from others for the same general purpose, together with what is claimed as new and desired to be secured by Letters Patent of the United States.

This part of my invention relates to that class of cultivator-plows used for cultivating both sides of a row of growing plants at the same time, and as the machine is drawn forward contiguous thereto by a draft animal attached to each side of the machine in such manner that each animal draws singly the plow on its side of the machine, known as side-draft cultivators.

The invention consists in two plow-beams connected by an arched beam-yoke in such manner that either end of said beam-yoke may be advanced or receded with its respective plow without disturbing the parallelism of the plow-beams, which are hinged or jointed to the yoke in such manner as to permit of their being moved or oscillated laterally and freely when the ends of the yoke are at right angles to the path of the machine, or when either end is advanced or receded.

The invention also consists in two plow-beams, connected by an arched beam-yoke in such manner that either end of said beam-yoke may be advanced or reeeded, with its respective plow, without disturbing the parallelism of the plow-beams, which are hinged or jointed to the yoke in such manner as to permit of their being moved or oscillated laterally and freely, and to sustain the plows in an upright working position, without rear connections or other supports. It also consists in two plow-beams connected by an arched beam-yoke in such manner that either end of said beam-yoke may be advanced or receded with its respective plow without disturbing the parallelism of the plow-beams, which are hinged or jointed to the yoke in such manner as to permit of their being moved or oscillated laterally and vertically, freely, when the ends of the yoke are right angles to the path of the machine, or when either end is advanced or receded, and at the same time sustain the plows in an upright working position without rear connections or other supports.

The invention further consists in the use of draft-rods or braces attached to the arched beam-yoke, so that the draft animal at each end of said yoke may draw its own plow, and the draft-braces tend to steady the arched yoke in an upright position when the draft is applied and the plows in use, and farther hinged to the beam-yoke, so as to be retained parallel with the line of progression of the machine, while the beam-yoke is obliquely thereto, all as hereinafter fully described.

Figure 2:
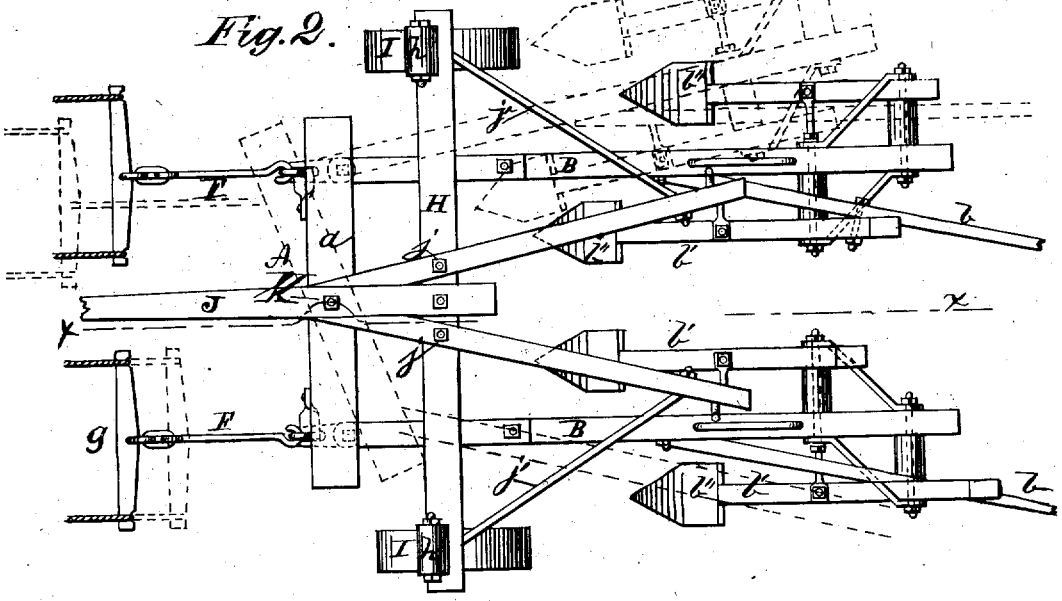

In the accompanying drawings, Figure 1 is a sectional view of a cultivator embodying my invention in the line *x x* of Fig. 2. Fig. 2 is a top-plan view.

Referring to the parts by letters, A represents an arched beam-yoke, consisting of an upper central part, *a*, and vertical side arms or parts *a'*. The vertical parts *a'* are flat bars, as shown in the drawings, and pierced with holes *a''*. B B are plow-beams, each having a handle, *b*, and standards *b'* carrying shovels *b''* affixed to its rear portion. C C are the joint pieces for hinging the plow-beams to the beam-yoke A. Their forward ends are bifurcated or formed into two flat plates, *c c*, which embrace a flat bar, *a'*, of the beam-yoke, and are pierced with a hole through which a bolt, *d*, passes to pivot them to the bar *a'* in such manner that they may have only a vertical movement on the bolt *d*, as an axis of flexure. The rear ends of the joint pieces C are flattened and embraced between an upper and a lower plate, *e*, which plates *e* constitute the forward end of the plow-beam, to which the rear ends of the plates *c* are pivoted by a bolt, *e'*, on which the plow-beam may have lateral movement only, as an axis of flexure.

F is the draft device, one at each end of the beam-yoke, consisting of an upper and lower bar *f f*, the lower bar hinged to the lower part of the vertical bar $a'$, and the upper bar hinged to its upper end or to the bar $a$, so that they may remain parallel with the line of progression of the machine, when the beam-yoke is obliquely thereto. The forward ends converge and are formed into a hook, $f'$, to which the single-tree $g$ is attached. H is a bar elevated and supported by side arms $h$, to the lower ends of which wheels I are journaled. J is a guide-pole secured upon the bar H by bolts $j$ and braces $j'$. K is a pivot-bolt passing loosely through the pole J and the central part of the bar $a$, and removably secured therein by a key, $k$. The bar $a$ may be freely oscillated in a horizontal plane on the bolt K.

In operation a plow-beam, B, is on each side of a row of plants, and is drawn, each beam, by the animal attached to its forward end by a single-tree, $g$, and as the machine is drawn across the field the beams B may be moved laterally and independently of each other, as shown by dotted lines at Fig 2, and on the axes $e'$, to avoid plants out of line, obstructions, &c., and independently vertically on the axes $d$ for any purpose desired, while at the same time they are held upright in working positions by their connections to the beam-yoke. Either animal may advance or recede in relation to its fellow animal, thus throwing the beam-yoke A obliquely with the path of the machine, as shown by dotted lines at Fig. 2, without disturbing the parallelism of the plow-beams with each other, and with the path of the machine, or interfering with the free vertical or lateral oscillation of the same, when operating either in advance of the other as the machine traverses the field. The draft-bars $f\,f$ act as braces when the draft is applied thereto, and tend to sustain the beam-yoke in a steady upright position, especially when the beams are flexed vertically, and much in the same manner that the draft applied to each end of the yoke holds it firmly while the plows are flexed laterally thereon.

What I claim as new, and desire to secure by Letters Patent, is—

1. Two plow beams, B B, connected together by an elevated beam-yoke, A, so that either may operate in advance of the other, while both are drawn forward in the line of progression by draft-animals attached to each side of the machine, so that each animal draws in a manner its adjacent plow, the attachment of the plow-beams to said yoke being by joints, which permit of moving the beams freely and independently in a lateral direction, combined and operating substantially as described, and for the purpose specified.

2. Two plow-beams, B B, connected together by an elevated beam-yoke, A, so that either may operate in advance of the other, while both are drawn forward in the line of progression by draft-animals attached to each side of the machine, so that each animal draws in a manner its adjacent plow, the attachment of the plow-beams to said yoke being by joints which sustain the plows in an upright working position without rear connections or other support, and permit of their being moved or oscillated freely in a lateral direction, combined and operating substantially as described, and for the purpose specified.

3. Two plow-beams, B B, connected together by an elevated beam-yoke, A, so that either may operate in advance of the other, while both are drawn forward in the line of progression by draft-animals attached to each side of the machine, so that each animal draws in a manner its adjacent plow, the attachment of the plow-beams to said yoke being by joints, which sustain the plows in an upright working position without rear connections or other support, and permit of their being moved or oscillated freely in a lateral or vertical direction, combined and operating substantially as described, and for the purpose specified.

4. The draft-bars $f\,f$, connected to the upper and lower portions of the arched beam yoke A, and arranged to operate with said beam-yoke and with the two plow-beams B B connected thereto, substantially as described, and for the purpose specified.

5. The draft-bars $f\,f$, hinged to the beam-yoke A, and combined to operate with said beam-yoke and plow-beams B B, substantially as described, and for the purpose specified.

In testimony that I claim the foregoing as my invention I have hereunto set my signature this 5th day of January, 1877.

JOHN SCHRÖDER.

Witnesses:
A. M. GIBBONS,
J. C. MCKENZIE.